March 4, 1958  R. J. SIMS  2,825,790
ADJUSTABLE-LEVEL COOKING APPARATUS
Filed Nov. 8, 1954  2 Sheets-Sheet 1
FIG.1.
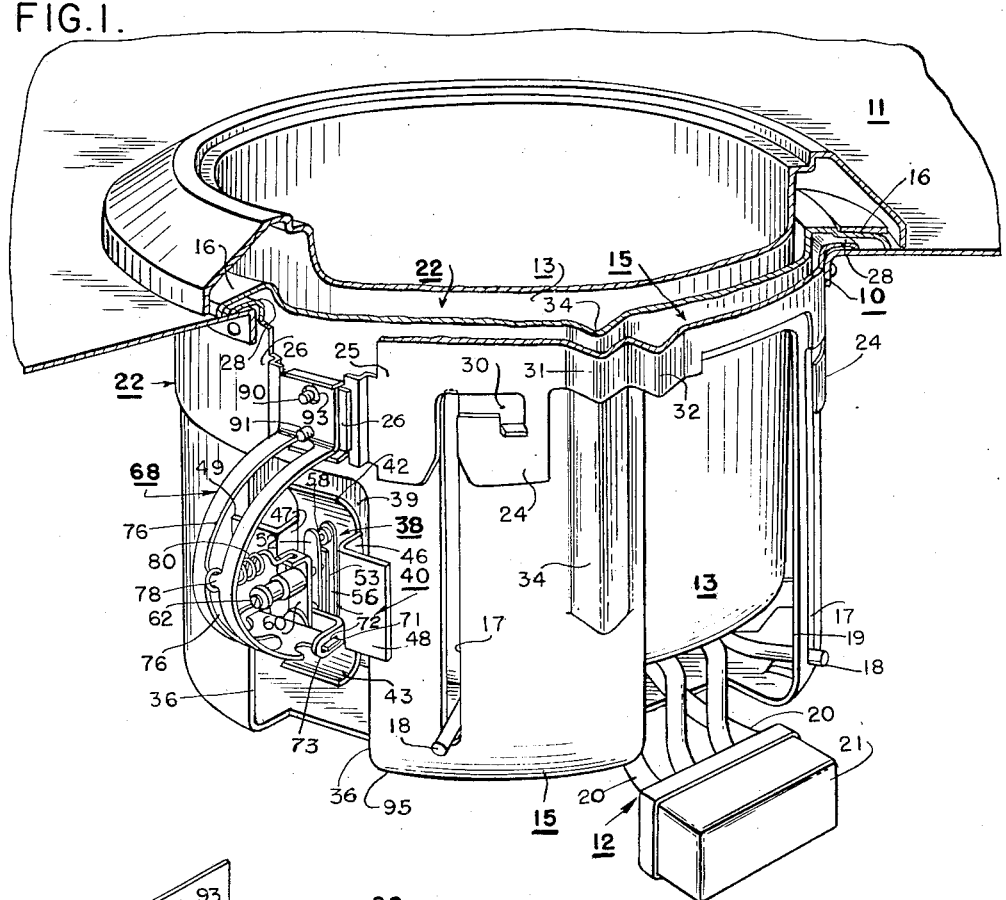
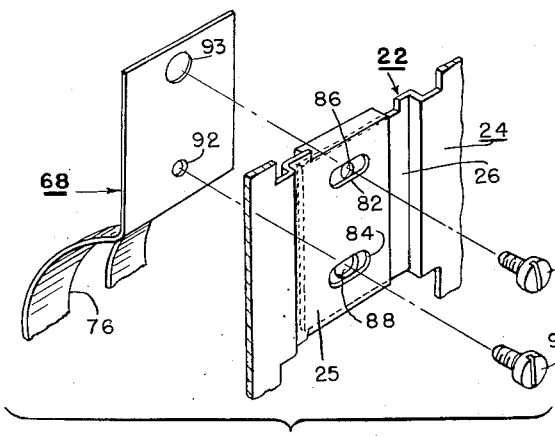
FIG.8.
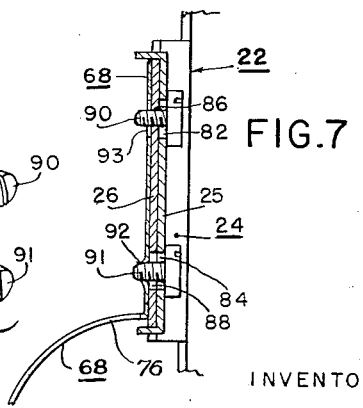
FIG.7
INVENTOR
ROBERT J. SIMS
BY
ATTORNEY March 4, 1958   R. J. SIMS   2,825,790
ADJUSTABLE-LEVEL COOKING APPARATUS
Filed Nov. 8, 1954   2 Sheets-Sheet 2

INVENTOR
ROBERT J. SIMS
BY
ATTORNEY

United States Patent Office 2,825,790
Patented Mar. 4, 1958

2,825,790

ADJUSTABLE-LEVEL COOKING APPARATUS

Robert J. Sims, Mansfield, Ohio, assignor to Westinghouse Electric Corporation, East Pittsburgh, Pa., a corporation of Pennsylvania Application November 8, 1954, Serial No. 467,390

5 Claims. (Cl. 219—37)

This invention relates to an adjustable level cooker of a type used on electric ranges and more particularly to a thermostatic means for controlling the temperature of a cooking vessel therein.

It is an object of this invention to provide a simple and inexpensive thermostatic means for sensing and controlling the temperature of a vessel removably carried by the electric heater of a cooker of the type set forth.

Another object of this invention is to provide thermostatic means of the above-mentioned type having a universal pivotal mounting to insure good engagement with the wall of a vessel.

It is a further object of this invention to provide a thermostat of the type referred to above which is constructed and mounted in such a manner as to prevent damage thereto by movement of the adjustable elements of the cooker.

The thermostatic device of this invention may be used in a deep well cooker of the type described and claimed in Weyrick Patent No. 2,664,493, issued December 29, 1953, and assigned to the assignee of the present invention. Reference may be had to this patent for detailed explanation of the construction and operation of all parts of a cooker in which the present invention may be used except for the novel thermostat mounting and assembly.

In accordance with this invention, an adjustable level electric heater in a deep well cooker is connected to be controlled by a thermostat that is swingably and pivotally mounted for movement adjacent the side of the well casing. The thermostat extends through a slot in the well casing wall and is biased into engagement with the side wall of a cooking vessel when the latter is supported on the heater and the heater is in its lower adjusted position. The thermostat is constructed to slide freely on the outer side wall of the vessel when the latter is moved vertically within the well. Upon removing the vessel from the well, the thermostat is biased into engagement with the outer wall of the movable well casing. The thermostat also slides freely on the well casing when the latter is moved to adjust the level of the heating unit and will assume positions which permit vertical and rotary movement of the well casing and of the cooking vessel without damage to the thermostat.

These and other objects are effected by the invention as will be apparent from the following description taken in connection with the accompanying drawings, forming a part of this application, in which:

Fig. 1 is a perspective view of a deep well cooker mounted in a range platform, with portions cut away for better illustration and showing a thermostat assembly attached thereto;

Fig. 7 is an enlarged vertical section of that portion of the assembly of Fig. 2 indicated by the bracket A showing the mounting for the thermostat supporting spring; and Fig. 8 is an exploded view of the spring mounting assembly shown in Fig. 7.

Figure 2:
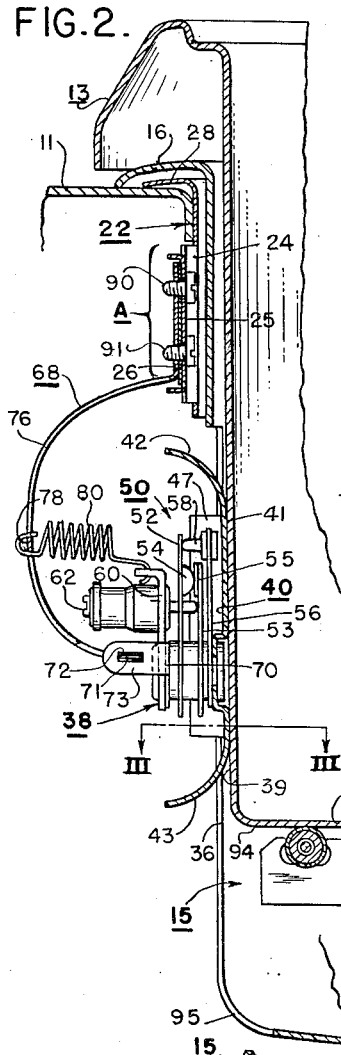
Fig. 2 is a slightly enlarged vertical section taken on the plane of symmetry of the thermostat assembly shown in Fig. 1 with parts of the thermostat and its mounting springs shown in full lines.
Figure 4:
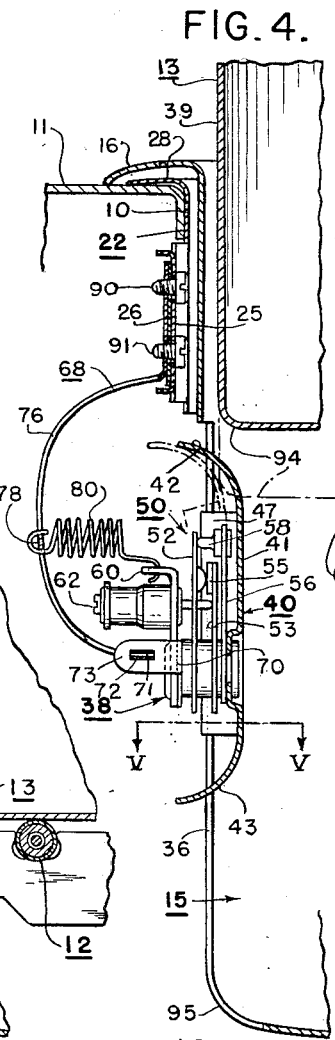
Fig. 4 is a vertical section similar to that of Fig. 2, but with the cooking vessel partially removed.

In Fig. 1 of the drawings, a deep well cooker is shown mounted in a circular opening 10 in a range platform 11. An adjustable level electric heating unit 12 is shown in its lower adjusted position with a generally cylindrical cooking vessel 13 supported on its flat horizontal heating surface.

A generally cylindrical well casing 15 encloses the vessel 13 and is provided with means in the lower portion thereof for supporting the heating unit in its lower adjusted position comprising a plurality of vertical slots 17, the lower closed ends of which are engaged by supporting arms 18 of the heating unit. The upper open end of the well casing 15 is supported in the opening 10 by means of a flange 16 at its upper periphery resting on the platform 11. A wide slot 19 is provided in the casing 15 to permit vertical movement of the heater terminal portions 20, the latter extending through the slot 19 to an external terminal block assembly 21.

Attached to the platform 11 and extending into the opening 10 is a means for supporting the heating unit 12 in an upper adjusted position comprising a ring 22 formed by a band 24 with its opposite ends 25, 26 joined, and having a flange portion 28 resting on the platform 11. The ring 22 is provided with slots 30 to support the arms 18 on the heating unit 12 when the latter is moved to its upper adjusted position by raising and rotating the well casing 15. The ring 22 is provided with two adjacent notches 31, 32 for guiding a vertical rib 34 on the side wall of the casing 15. The rib must be aligned with one of these two notches before the casing can be lowered to the level shown in Fig. 1. The slots 17 and 19 are elongated vertically to permit the casing to be moved to this lower level when the heating unit 12 is retained in its upper adjusted position by the ring 22. The cooperation of the supporting ring 22, the heater 12, the well casing 15 and the removable cooking vessel 13 referred to above is explained in detail in the above-mentioned patent.

A vertical slot 36 is provided in the well casing 15 to permit a thermostat assembly 38 that is mounted outside the casing 15 to engage and sense the temperature of the side wall 39 of the cooking vessel 13 within the casing. The thermostat assembly 38 comprises a frame 40 of good heat conducting material and having a slightly concave or arcuate vessel engaging surface 41. The upper and lower ends 42 and 43 of the surface 41 are curved or bent in the direction away from the vertical axis of the well to facilitate smooth sliding movement of the cooking vessel and the well casing with respect thereto in a manner described hereinafter. Extending away from the vessel engaging surface 41 are a pair of parallel portions 46 and 47 of the frame 40, the ends of the portions 46 and 47 being bent outwardly to form substantially coplanar flanges 48 and 49 to engage the well casing on opposite sides of the slot 36 when the cooking vessel 13 is removed.

The thermostat assembly 38 comprises a stack type thermostatic switch 50, generally of the type shown in P. R. Lee Patent No. 2,689,897, dated September 21, 1954, and assigned to the assignee of the present invention. The switch 50 is connected in series with the electric heater 12 by suitable means (not shown). A pair of electrically conducting spring arms 52 and 53 are fixed in the stack by suitable insulators and support movable cooperating contacts 54 and 55, respectively. A bimetal strip 56 has one end supported in the stack in good heat conducting relationship to the frame 40 and its other end is free to deflect in response to a predetermined increase in temperature to move spring arm 52 and the contact 54 away from contact 55 thereby opening the electrical circuit through the switch 50 and the heater 12. An insulating button 58 is mounted on the free end of the bimetal permitting the latter to move the spring arm 52 without being electrically connected thereto. A plate member 60 is secured in the stack and has an adjusting screw 62 threaded therein to position the relatively fixed spring arm 53 to determine the temperature at which the switch contacts will separate.

Figure 6:
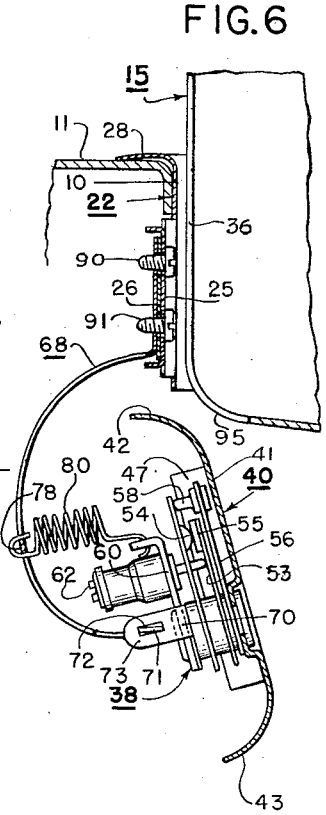
Fig. 6 is a vertical section similar to that of Fig. 2, but with the cooking vessel completely removed and the well casing in an elevated position.

The thermostat assembly 38 is swingably supported from the ring 22 by means including an arcuate or generally semi-circular leaf spring 68, the upper end of which is fixed on the ring 22, the lower end being biased to the position shown in Fig. 6. The lower end of the leaf spring 68 is pivotally attached to a U-shaped member 70 in the switch stack by means comprising two oppositely-extending flat projections 71 which are received in elongated parallel slots 72 in opposed sides 73 of the U-shaped member 70. The slots 72 are slightly larger than the flat projections 71 to permit limited pivotal movement of the thermostat assembly 38 with respect to the lower end of the leaf spring 68. The opposed sides 73 of the U-shaped member are located approximately midway between the upper and lower portions 42 and 43 of the frame 40 in order to apply the force of the leaf spring 68 near the center of the thermostat assembly 38. The leaf spring 68 has a pair of longitudinal slots 76 which extend end to end substantially the entire length of the spring and are separated at an intermediate point near its center by a bridging piece 78.

Means is provided to pivotally bias the thermostat assembly 38 with respect to the leaf spring 68 comprising a coil spring 80 having one end attached to the plate member 60 at a point above the slots 72 in the U-shaped member 70. The other end of the coil spring 80 is secured to the bridging piece 78. The tension of this coil spring biases the thermostat assembly in a counterclockwise direction (as seen in Fig. 2) about the leaf spring projections 71 on the lower end of the leaf spring 68.

The enlarged Figs. 7 and 8 show in detail the portion of Fig. 2 marked by bracket A. The upper end of the leaf spring 68 is shown supported at the junction of the ends 25 and 26 of the band 24 which forms the supporting ring 22. The end 25 of the band is provided with two vertically-disposed horizontally-extending slots 82 and 84. The other end 26 of the band has two holes 86 and 88 aligned with the slots 82 and 84. A screw 90 extends through the slot 82 and is threaded in the upper hole 86 to hold the band ends 25 and 26 in firm engagement. The second screw 91 passes through the lower slot 84 and the slightly enlarged lower hole 88 and is threaded in a lower hole 92 on the upper end of the leaf spring. A larger hole 93 is provided above hole 92 to permit passage of the screw 90 although the sides of the hole 93 do not engage the screw. It is, therefore, apparent from Figs. 7 and 8 that the screw 90 serves primarily to hold the band ends 25 and 26 together whereas the screw 91 supports the leaf spring 68 in addition to clamping the band ends.

Figure 3:
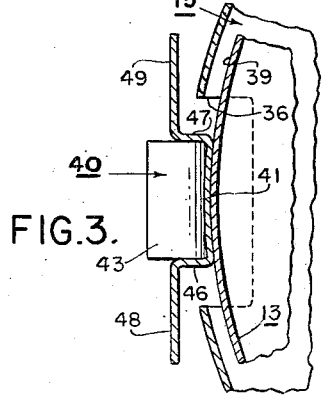
Fig. 3 is a horizontal section taken along the line III—III of Fig. 2.
Figure 5:
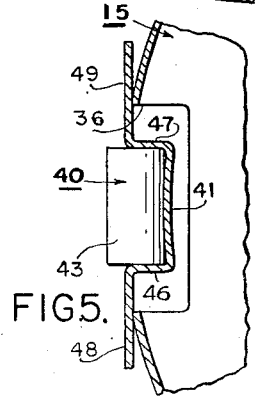
Fig. 5 is a horizontal section taken along the line V—V of Fig. 4.

Referring to Figs. 2 through 6, the swinging and pivotal movement of the thermostat assembly 38 under the influence of the leaf spring 68 and the coil spring 80 may be readily ascertained. In Figs. 2 and 3, the thermostat assembly 38 is biased into engagement with the cooking vessel by the leaf spring 68 and the flanges 48 and 49 are held in spaced relation with respect to the well casing 15. When the cooking vessel 13 is removed from the well, the thermostat assembly will be moved by the spring 68 to the position shown in Figs. 4 and 5 in which the flanges 48 and 49 engage the well casing 15 at opposite sides of the slot 36. When the cooking vessel is reinserted in the well 15, its lower peripheral portion 94 will first engage the upper curved end 42 of the thermostat frame 40 and pivot the latter in a counterclockwise direction to the position shown in dotted lines in Fig. 4. Upon further downward movement of the cooking vessel 13, the thermostat assembly will slide smoothly thereon and assume the position shown in Fig. 2 against the side of the vessel.

After removing the cooking vessel 13 and while raising the well casing 15 to clean it or to adjust the level of the heater 12, the flanges 48 and 49 will slide along the edges of the slot 36 until the thermostat assembly 38 swings free in the position shown in Fig. 6. In this position, the thermostat assembly 38 is not only moved further to the right by the leaf spring 68 but is also decidedly cocked in a counterclockwise direction under the influence of the coil spring 80. This cocked position in which the upper end 42 of the frame 40 is spaced farther from the well axis than is the lower end 43, will insure that the edges of the slot 36 adjacent the lower portion 95 of the well casing will first engage the flat surface of the flanges 48 and 49 intermediate their upper and lower ends to cam the thermostat assembly back to the position shown in Fig. 4 and prevent binding as the well casing is lowered.

The slot 36 is made wide enough to prevent interference with the thermostat assembly 38 when the well casing is rotated by an amount which moves the rib 34 between the positions in which it is aligned with the notches 31 and 32.

The completely flexible and pivotal mounting of the thermostat assembly insures that no damage will result thereto during normal movement of the cooking vessel 13 and the well casing 15 and further insures that the frame 40 will be positioned in good heat transfer relationship with the vessel when the latter is received in the well as shown in Fig. 2. Although the primary movements of the thermostat assembly are the swinging and pivotal movements about horizontal axes, the loose fit of the projections 71 in the slots 72 and the construction of the leaf spring 68 permit slight rotating movement of the thermostat assembly about a substantially vertical axis to further insure this good heat transfer relationship.

The thermostat assembly 38 may be adjusted to control the temperature of the cooking vessel 13 and its contents when the heater is in its lower adjusted position. It also operates as a safety device either to protect both the vessel 13 and the casing 15 when the heater is inadvertently turned on with nothing in the vessel 13, or to protect the casing 15 when the heater is energized but the vessel 13 is removed. Sufficient heat will be conducted to the bimetal from the flanges 48 and 49 to prevent the over-heating of the casing 15 when the vessel is empty or is removed.

When the heater is supported as a surface unit in its upper adjusted position, the thermostat will normally remain closed since the heater will not be able to overheat the lower portion of the casing.

While the invention has been shown in but one form, it will be obvious to those skilled in the art that it is not so limited, but is susceptible of various changes and modifications without departing from the spirit thereof.

What is claimed is:

1. A deep well cooking unit for an electric range comprising a range platform having an opening therein, an adjustable well casing having an upper open end supported in registry with said opening, an electric heating unit supported within a lower portion of said casing, a removable cooking vessel supported within said casing on said heating unit, a thermostatic switch having a vessel engaging surface and being electrically connected to control the energization of said heating unit, a leaf spring supporting said switch for swinging movement, one end of said leaf spring having fixed supporting means adjacent the outside of said casing, but independent thereof, the other end of said leaf spring being pivotally connected to said thermostatic switch, said casing having a slot in the side thereof, said leaf spring positioning said switch in said slot and biasing said vessel engaging surface into good heat conducting relationship with said vessel, and flanges of good heat conducting material extending outwardly on opposite sides of said switch for engaging said casing adjacent said slot to limit movement of said switch under the influence of said spring when said vessel is removed, said flanges being attached to said switch in good heat transfer relationship therewith, said flanges being slidable on said casing during movement of the latter while adjusting the level of said heater relative said platform when said vessel is removed.

2. An adjustable level cooking unit for an electric range comprising a range platform having an opening therein, a generally cylindrical vertically movable casing having its upper end supported in registry with said opening, an adjustable level electric heating unit, means for supporting said heating unit within said casing in a lower adjusted position, a generally cylindrical cooking vessel vertically movable within said casing and adapted to be supported therein in a first position on said heater when the latter is in said lower adjusted position, second means suspended from said platform for supporting said heater in an upper adjusted position, said casing having a slot in the side thereof, a thermostatic switch supported outside said casing independently thereof and extending through said slot to engage said cooking vessel when the latter is in said first position, said thermostatic switch being connected to control energization of said heating unit, a leaf spring for supporting said thermostatic switch for swinging movement and biasing it into engagement with said vessel, said leaf spring having a fixed end supported adjacent to said second means and its other end pivotally attached to said thermostatic switch to support the latter for limited pivotal movement, and said thermostatic switch having attached means movable therewith to engage the casing on opposite sides of said slot to limit its swinging movement under the influence of said spring when said cooking vessel is removed, said last-mentioned means being slidable on said casing during vertical movement of the latter.

3. An adjustable level cooking unit for an electric range comprising a range platform having an opening therein, a vertically movable casing supported by said platform in said opening, an adjustable level electric heating unit, means for supporting said heating unit within said casing in a lower adjusted position, a removable cylindrical cooking vessel vertically movable within said casing and supported therein on said heater, said casing having a slot in the side thereof, a thermostatic switch supported outside said casing and extending through said slot to engage said cooking vessel, said thermostatic switch being connected to control energization of said heating unit, a first spring for supporting said thermostatic switch for swinging movement and biasing it into engagement with said vessel for good heat transfer therebetween, second means suspended from said platform for supporting said heater in an upper adjusted position, said first spring having one end attached to said second means and its other end pivotally attached to said thermostatic switch to support the latter for limited pivotal movement, a second spring connected between said first spring and said thermostatic switch to pivotally bias the upper portion of said switch in the direction away from said vessel, and said thermostatic switch having means thereon to engage the casing on opposite sides of said slot to limit its swinging movement under influence of said first spring when said cooking vessel is removed, said last-mentioned means being so constructed and adapted as to slide freely on said casing as the latter is moved vertically.

4. An adjustable level cooking unit for an electric range comprising a range platform having an opening therein, a vertically movable casing supported by said platform in a first position in said opening, an adjustable level electric heating unit, and means for supporting said heating unit within said casing in a lower adjusted position, a removable cylindrical cooking vessel vertically movable within said casing and adapted to be supported therein in a first position by said heater when the latter is in said lower adjusted position, said casing having a slot in the side thereof, a thermostatic switch supported outside said casing and extending through said slot to engage said cooking vessel, said thermostatic switch being connected to control energization of said heating unit, second means attached to said platform for supporting said heater above said switch in an upper adjusted position, a leaf spring supporting said thermostatic switch for swinging movement and biasing the latter into engagement with said vessel, said leaf spring having a fixed upper end supported above said thermostatic switch and a lower end pivotally attached to said thermostatic switch to support the latter for limited pivotal movement thereon, a coiled tension spring having one end connected to said thermostatic switch above its pivotal support and its other end connected to an intermediate portion of said leaf spring, said thermostatic switch having a vessel engaging surface and a pair of flanges offset with respect to said surface in a direction away from said vessel, said flanges extending beyond the sides of said slot to limit the movement of said thermostat under the influence of said leaf spring when said vessel is removed, said thermostat being cocked by said coiled spring with its upper end farther from the central axis of said cooker than its lower end when the casing is raised to a position in which it is disengaged from said flanges, said leaf spring positioning said thermostatic switch so that the sides of said slot first engage intermediate portions of said flanges when said casing is moved from said raised disengaged position to said first position.

5. An adjustable level cooking unit for an electric range comprising a range platform having an opening therein, a vertically movable casing supported by said platform in said opening, an adjustable level electric heating unit, means for supporting said heating unit within said casing in a lower adjusted position, a removable cylindrical cooking vessel vertically movable within said casing and adapted to be supported therein in a first position on said heater when the latter is in said lower adjusted position, said casing having a slot in the side thereof, a thermostatic switch supported outside said casing and extending through said slot to engage said cooking vessel, said thermostatic switch being connected to control energization of said heating unit, a leaf spring of generally semi-circular shape supporting said thermostatic switch for swinging movement and biasing the latter into engagement with said vessel, second means supported by said platform for supporting said heater in an upper adjusted position, said leaf spring having its upper end supported above said thermostatic switch on said second means, the lower end of said spring supporting said thermostatic switch for limited pivotal movement thereon, a coiled tension spring having one end connected to said thermostatic switch above its pivotal support and its other end connected to an intermediate portion of said leaf spring, said thermostatic switch having a vessel engaging surface, and a pair of flanges offset with respect to said surface in a direction away from said vessel, said flanges extending beyond the sides of said slot to limit the movement of said thermostat under the influence of said leaf spring when said vessel is removed, said thermostat being cocked with its upper end far from the central axis of said cooker when the casing is disengaged from said flanges, said leaf spring positioning said thermostatic switch so that the sides of said slot are first engaged in intermediate portions of said flanges when said casing is moved from its upper position to its lower position.

References Cited in the file of this patent

UNITED STATES PATENTS

| | | |
|---|---|---|
| 2,528,579 | Clark | Nov. 7, 1950 |
| 2,678,379 | Fry | May 11, 1954 |
| 2,767,299 | Valentine | Oct. 16, 1956 |